Jan. 16, 1968  R. O. YAVNE  3,363,470
ACCELEROMETER
Filed July 20, 1964  2 Sheets-Sheet 2

INVENTOR.
RAPHAEL O. YAVNE
BY Paul Maleson
ATTORNEY

United States Patent Office 3,363,470
Patented Jan. 16, 1968

3,363,470
ACCELEROMETER
Raphael O. Yavne, 1102 Paper Mill Road,
Wyndmoor, Pa. 19118
Filed July 20, 1964, Ser. No. 383,574
1 Claim. (Cl. 73—515)

This invention relates to an improved accelerometer. More particularly it relates to accelerometers of the type comprising a pendulum or an otherwise supported mass. It is specifically concerned with a new type of pendulum which may be employed in accelerometers and other instruments using pendulums.

A conventional pendulum, such as is used in pendulum type accelerometers, is basically in itself a highly sensitive low frequency accelerometer. Furthermore, a conventional accelerometer may employ a mass supported by a spring or other known supporting agency, such as a magnetic field, without being supported from a pivot as is a conventional pendulum. This invention also has application to accelerometers of this type.

The conventional pendulum consists of a mass supported from a rigid bar which in turn is pivoted to a support. The entire pendulum is completely submerged in a damping fluid. The conventional accelerometer other than the pendulum type accelerometer utilizes a mass supported by a spring or other resilient means and is also entirely submerged in a damping fluid. Pickoff means are provided to sense the direction and magnitude of motion of the mass relative to the supporting base member. Means are also conventionally supplied to convert the pickoff signals to any convenient desired form of information or to servo the instrument itself. This is true of both pendulum type accelerometers (and other pendulum instruments) and resiliently supported mass accelerometers.

For reasons explained below in more detail, the masses used in pendulums, pendulum type accelerometers, and resiliently supported mass accelerometers are provided of relatively high density compared to that of the damping fluid.

Hereinafter, in this specification and claims, the term "pendulum" is used to refer to a pendulum either as part of an accelerometer or in any other instrument or mechanism utilizing a pendulum. The term "accelerometer" is used hereinafter in this specification and claims to refer to any accelerometer utilizing an at least partially solid mass which may be suspended as a pendulum or resiliently, as by a spring, or in other known ways.

The conventional accelerometer or pendulum loses in its efficiency, as measured by sensitivity, frequency, or both, because the acting forces on the submerged mass are reduced by the effect of Archimedes' Law and also because part of the damping fluid in which the mass is submerged participates dynamically in the motion of the accelerometer mass or pendulum. The amount of such participation depends on the configuration of the moving mass and on the total geometry of the system, as for example, the size of the chamber in which the mass is supported. To minimize these losses in efficiency, the accelerometer or pendulum mass is conventionally made of high density material, such as steel for example, and a damping fluid is conventionally provided which has a relatively low density, such as a silicon fluid, for example.

The term "mass" used hereafter in this specification and claims refers to the submerged body of the pendulum bob or the inertial bodies provided in accelerometers of other types.

The configuration of the mass is also provided so as to reduce the dynamic participation of the fluid in the motion of the mass. In general, as is described in more detail below, the submerged body or mass is elongated with its long axis aligned with the direction of motion and a cross-sectional area as small as possible in a direction perpendicular to the direction of motion.

It is an object of this invention to provide an accelerometer with improved efficiency.

It is an object of this invention to provide a pendulum with improved efficiency.

It is another object of this invention to provide a pendulum mass, a pendulum type accelerometer mass, or a resiliently supported mass accelerometer wherein said masses are submerged in a damping fluid, and said masses have an average density relatively small compared to that of the damping fluid.

Yet another object of this invention is to provide a supported mass, and a damping fluid surrounding said mass, the average density of said mass being less than that of the said damping fluid. It is a still further object of this invention to provide a mass to be utilized in a pendulum, a pendulum type accelerometer, or other form of mass accelerometer wherein the mass is at least partly solid, comprising a hollow portion within said mass.

Yet another object of this invention is to provide a pendulum or accelerometer mass wherein said mass comprises a thin solid shell and is filled with a gas, and the damping fluid surrounding said mass in said pendulum or accelerometer has a density relatively high compared to the average density of said mass, whereby a temperature compensated instrument is provided.

This invention is best understood in connection with the accompanying drawings, which form a part of this disclosure. In the drawings, like reference numerals refer to like parts and:

It is understood that all the drawings in this specification are somewhat idealized and schematic. Furthermore, the dimensions of the masses are shown so as to more clearly illustrate the principles involved. The thickness of the mass shell walls, for example, are shown exaggerated for clarity.

Figure 1:
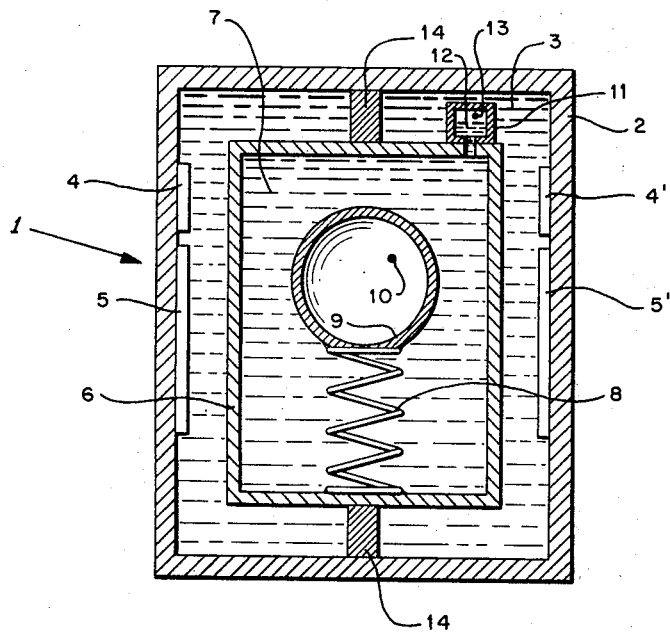
FIG. 1 is a vertical cross-sectional view of an accelerometer utilizing a resiliently supported mass.

FIGURE 1 is an idealized vertical cross-sectional view of an accelerometer generally indicated at 1. A mass 9 is provided with a hollow interior 10. The mass 9 is resiliently supported on spring 8. A chamber 6 completely encloses the mass and resilient support, which are completely submerged in damping fluid 7. As shown, chamber 6 of course comprises a wall or walls, at least one of which is necessarily closest to the mass 9. An expansion chamber 11 is provided on the chamber 6 to allow for variations in the volume of the chamber contents with temperature. The chamber 6 is filled with fluid to such an extent that the expansion chamber 11 is only partially filled, having a volume 13 devoid of fluid. This space 13 may be gas-filled. The expansion chamber fluid 12 rises and falls in the expansion chamber with variations in temperature, thus minimizing pressure variations due to variations in temperature.

The additional structure shown in FIGURE 1 represents more or less conventional means for providing temperature stability for the accelerometer mass. The chamber 6 is mounted on supports 14 within an outer casing 2. This casing 2 is in turn filled with a fluid 3. Temperature sensing elements 4 and 4' are provided to determine the temperature at various points within the casing and heating elements 5 and 5' are provided to supply such heat as may be needed to maintain the temperature of fluid 3 constant or within specified limits.

It is understood that the important aspects of this invention reside in the mass 9 being provided hollow and preferably gas filled so that the average density of the mass 9 is less than that of the damping fluid 7. Thus, the mass 9 tends to "float" and therefore is shown above the spring 8 in a tension condition. The conventional accelerometer mass would have a "positive" weight and would place the spring 8 in a compressed condition if it were mounted as shown in FIGURE 1. The theory and advantages of this form of accelerometer are explained below. An essential aspect of the invention lies in the provision of a mass of less average density than the surrounding medium, preferably an average density negligible compared to the density of the medium.

The fluid expansion means and the constant temperature means may of course be varied widely as is well known in the art. Such means described and illustrated herein are considered to be only one of many possible forms for these functions.

The mass 9 as illustrated in FIGURE 1 is shown with a shell or wall of substantial thickness for the purpose of better illustrating the invention. In practice, the mass 9 would normally have a relatively very thin shell, so that the density of the mass is negligible compared to the density of the displaced fluid.

Means by which the mass 9 can be constructed so as to minimize or eliminate the effect of temperature differentials are discussed below.

It is understod that the accelerometer illustrated in FIGURE 1 is a one-dimensional accelerometer, measuring the accelerations along the long axis of spring 8. It is also understood that sensing and interpreting equipment, such as is well known, is provided so that the effects of acceleration on the mass may be converted into useful information. Such means are described in further detail below.

Figure 2:
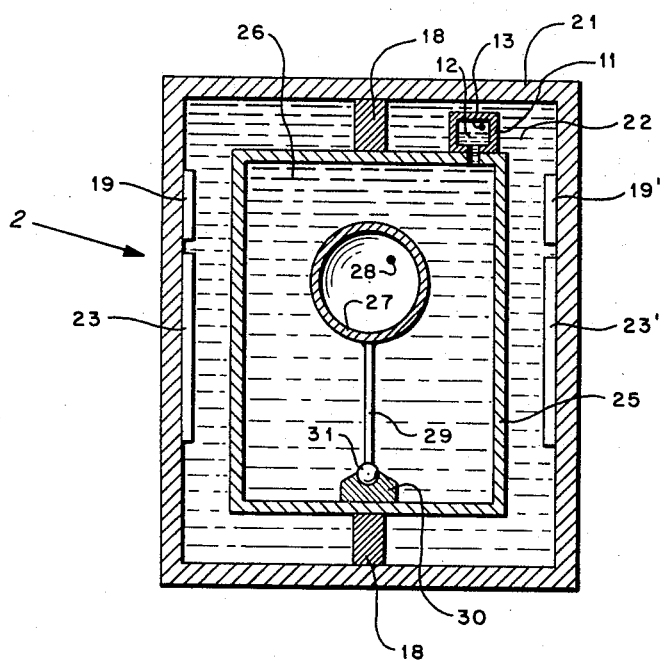
FIG. 2 is a vertical cross-sectional view of an accelerometer utilizing a rigid-arm pivoted pendulum as a mass.

FIGURE 2 also represents an accelerometer, generally designated at 2, differing from that instrument illustrated in FIGURE 1 in that it utilizes a pendulum or bob-type mass instead of a resiliently supported one. A mass 27, having a hollow interior 28 is provided. This mass 27 is fixed to a rigid arm 29, having a pivot 31 at the end thereof. The pivot 31 is mounted to pivot block 30. The pendulum assembly is mounted inside chamber 25, which is filled with damping fluid 26.

The expansion chamber illustrated in FIGURE 2 is identical with that of FIGURE 1. The chamber 25 is mounted in casing 21 by means of supports 18 and is surrounded by a fluid 22. Temperature sensing elements 19 and 19' are provided as are heating elements 23 and 23', for the same purposes as are described in connection with the embodiment of FIGURE 1. The fluid 22 and the fluid 3 are of course provided to insure a more uniform temperature environment around the chambers 25 and 6.

The pendulum type accelerometer illustrated in FIGURE 2 is a two-dimensional accelerometer, assuming that it has unrestricted freedom of movement around pivot 31. This accelerometer measures acceleration in a plane perpendicular to that measured by the accelerometer of FIGURE 1.

Before describing the remaining figures in the drawings, the theory of operation of this invention will be discussed. It will be noted that both the resiliently mounted mass illustrated in FIG. 1 and the pendulum mass illustrated in FIG. 2 are "inverted," that is, they are lighter than their surrounding mediums and have a relatively small density or mass compared to that of their surrounding mediums. As will be explained below, the density of the accelerometer bob or mass should be made relatively low as possible, after considering structural problems and the requirements of temperature compensation.

The forces and masses participating in the dynamic motions of the accelerometer, whether utilizing a pendulum-bob mass or a resiliently mounted mass, are given in the following formulas:

(1) $$F = V(\rho_m - \rho_f)a$$

(2) $$M = V\left(\rho_m + \frac{1}{c}\rho_f\right)$$

Where:

F is the effective force acting on the submerged mass
V is the volume of the submerged mass.
$\rho_m$ is the average specific gravity of the submerged mass.
$\rho_f$ is the specific gravity of the damping fluid.
$a$ is the outside acceleration imparted to the accelerometer.
M is the effective mass of the moving system.
$c$ is the configuration constant.

The effective acceleration (designated "A") of the abovedescribed system, is given by the following formula:

(3) $$A = \frac{F}{M} = \frac{V(\rho_m - \rho_f)a}{V\left(\rho_m + \frac{1}{c}\rho_f\right)} = \frac{\rho_m - \rho_f}{\rho_m + \frac{1}{c}\rho_f} a$$

If $\rho_m$ is made very large compared to $\rho_f$, by using a very high density mass and a relatively low density fluid, as in the conventional accelerometer, A approaches $a$, but is nevertheless smaller. It is desirable of course in the conventional accelerometer to provide the highest possible effective acceleration and to minimize the dynamic effects of motion of the damping fluid. It is apparent from Formula 3 that the effective acceleration is limited.

The herein disclosed invention, using an "inverted" mass, uses Archimedes' law to increase the efficiency of the accelerometer, rather than treating it as an obstacle to be overcome. As has been described above in connection with FIGURES 1 and 2, the invention contemplates providing a mass of very small average density relative to the density of the displaced damping fluid in which it is submerged. Thus, when the mass of the submerged body is made very small or negligible compared to the mass of the displaced fluid, by Archimedes' law, the forces acting on the submerged mass reverse their direction and are mainly the hydrostatic forces of the fluid acting on the mass. This can be seen from Formula 1 as approximated in the following formula:

(4) $$F = V(\rho_m - \rho_f)a \approx -V\rho_f a$$

The effective mass may also be approximated from Formula 2 as:

(5) $$M = V\left(\rho_m + \frac{1}{c}\rho_f\right) \approx V\frac{1}{c}\rho_f$$

The effective acceleration may be approximated from Formula 3 as follows:

(6) $$A = \frac{F}{M} = \frac{\rho_m - \rho_f}{\rho_m + \frac{1}{c}\rho_f} a \approx -\frac{\rho_f}{\frac{1}{c}\rho_f} a = -ca$$

Therefore, if c is made large $\rho_m$ negligible compared to $\rho_f$ and to $$\frac{1}{c}\rho_f$$

then A is reversed in direction as compared to $a$ and would be magnified by the factor $c$.

To further increase the ratio $\rho_f/\rho_m$, the density of the damping fluid can be made very high by using heavy materials. For example, a very high density fluid such as mercury may be a highly desirable damping fluid.

An accelerometer constructed according to my invention can be made insensitive or nearly insensitive to temperature variations, independently of external temperature stabilizing means as exemplified in FIGS. 1 and 2. Formula 6 shows that for very large $\rho_f/\rho_m$ ratios the effective acceleration of the accelerometer is practically independent of the thermal expansion characteristics of the damping fluid or the mass since $c$ is only a configuration constant. However, the effective force on the accelerometer is equal to $-V\rho_f a$ as shown in Formula 4. For the accelerometer to be insensitive to ambient temperature, the volume V of the submerged mass must change with temperature in such a way as to compensate for the variations in the fluid density and spring constant caused by temperature. If the spring constant does not vary significantly with temperature, the volume V must vary in such a way that $V\rho_f$ is constant.

The temperature compensating means is as follows: The hollow interior (10, 28, 45, 50, 56) of the mass is filled with a light gas. The thin shell of the mass thereupon expands with higher temperatures due to the increase in the pressure of the contained gas. The amount of shell expansion and hence the increase in volume of the mass with a given temperature increment can be varied by choice of the initial gas pressure and mass shell thickness and material. For a given shell thickness and material, for example, a steel shell of 0.01" thickness, a specific pressure of the enclosed gas exists which produces optimum temperature insensitivity at the design temperature, the system has maximum temperature insensitivity and at other temperatures, there is still some compensation. The steel shell of course maintains a fixed general configuration of the mass in spite of the small pressure flexings as described. That is, for example, the spheres as shown in FIGURES 1 and 2 remain generally spherical as the temperature changes. For any specific accelerometer system, the required pressure can be determined either by computation or experimentally. It is understood that many different accelerometers can be constructed following this invention, and each one may have different dimensions and other specifications for example, in mass size, shell material and thickness, mass shape, design temperature, damping fluid. For any given combination of such dimensions and other specifications, the proper initial gas pressure to attain optimum temperature insensitivity may differ. Once understanding the expansion conditions which are to be attained in the practice of the temperature compensation aspect of this invention, as described above, any competent engineer can pick the gas pressure to achieve them.

Helium, for example, is a satisfactory gas for filling the submerged mass, since it is light and non-corrosive. Mercury, for example, is satisfactory for the damping fluid, since it is heavy and also has a relatively small temperature expansion coefficient. Of course, in choosing materials, many other well known design factors must be considered; for example, the damping fluid must be satisfactory considering corrosiveness, stability, freezing and boiling point, compressibility etc. When such factors are considered, many materials other than those specifically named in this disclosure will be found suitable for particular applications.

While that aspect of this invention relating to temperature insensitivity of the mass-fluid system itself is important, it is understood that the inverted mass principle can be utilized without resort to the temperature insensitivity improvement. For example, in particular applications, enough temperature stability can be imparted to the system by the external means described above in connection with FIGURES 1 and 2.

Any known displacement sensing and measuring means can be used with the accelerometer herein disclosed. For example, potentiometer or capacitance pickoffs can be provided, or bonded or unbonded strain gauges can be used. Optical pickoffs may be used in certain applications. The provision of pickoff of sensing means is a matter of design and no particular such means is to be considered a part of this invention.

In like manner, the particular electrical, electronic or other apparatus used to measure or interpret the output of the sensing means or to servo the system back to null is not considered part of this invention. Many such means are known in the art; for example, the nulling bridge.

The mass constructed according to this invention may be captured, having a micro-pick-off which servos the mass to null, usually by variable current. Captured mass accelerometers are very linear.

The accelerometer mass constructed according to this invention can be used in many applications. For example, accelerometers used in inertial navigation, including gyro accelerometers and integrating accelerometers, vertical seekers (pendulums), gravity meters, time measurement devices, and acceleration-operated switches, all may utilize masses constructed as described herein. In short, any apparatus using accelerometer masses or pendulums may use the masses or pendulums of this invention, though the effects of this invention have more advantages in some applications than others.

The factor $c$ can be made quite large (of the order of 10 or more) if the submerged mass is provided long and slender with its long axis aligned with the direction of action of the acceleration to be measured, and the dimensions of the chamber containing the damping fluid are large compared to the dimensions of the submerged mass. It is desirable to make the factor $c$ as large as possible. This effect is partially obtained by fairing the submerged mass. To maintain a high value of $c$, it is important to keep the cross-sectional area perpendicular to the long axis as small as possible.

For a three-dimensional motion accelerometer, the best configuration is a sphere, as is illustrated in FIGURES 1 and 2, which has a $c$ value of 2 if the chamber dimensions are large compared to the sphere radius.

In FIGURES 3 through 6, various mass or pendulum bob configurations are illustrated, being representative or typical of configurations suitable for accelerometers of different dimensional response and of varying support type.

Figure 3:
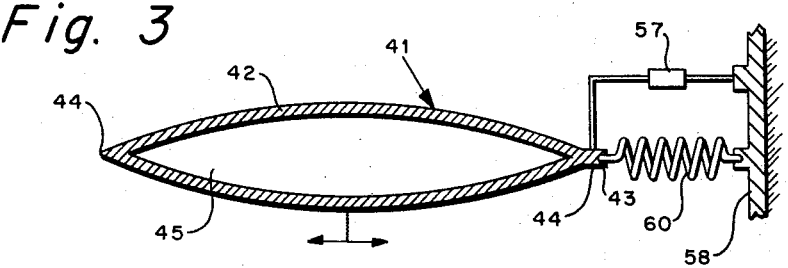
FIG. 3 is a vertical view, partly in cross-section, of another embodiment of a resiliently supported mass.

In FIGURE 3, an accelerometer mass and resilient support are schematically illustrated. This form of mass is suitable for measuring one-dimensional acceleration in the direction indicated by the small arrows. The elongated mass 41 comprises a thin shell 42, enclosing a hollow interior 45. The mass 42 is tapered at the ends to points 44. This type of structure results in a high $c$ value as is desired. The mass 41 is shown attached to the chamber 58 by means of a spring 60 attached to the mass at joint 43. Sensing means are provided to measure the acceleration forces acting on the mass 41, and such sensing means 57 are shown in FIGURE 3. This schematic sensing means could be of the strain gauge type. It is understood that both the resilient support and the sensing means are schematically and illustratively shown in FIGURE 3; such means are commonly far more sophisticated.

Figure 4:
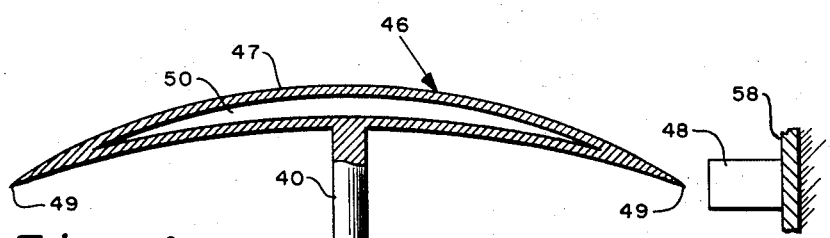
FIG. 4 is a vertical view, partly in cross-section, of another embodiment of a pendulously supported mass.

In FIGURE 4, a mass of the pendulum-bob type is illustrated, also adapted for one-dimensional acceleration measurement. The mass 46 comprises a thin shell 47 enclosing a hollow interior 50. The mass is tapered at the ends thereof to points 49. The mass 46 is attached to a pendulum pivot (not shown) by means of arm 40. A displacement measuring means or sensing means 48 is provided attached to a chamber 58. For purposes of showing typical systems, the sensing means illustrated in FIGURE 4 schematically represents a capacitance pickoff.

Figure 5:
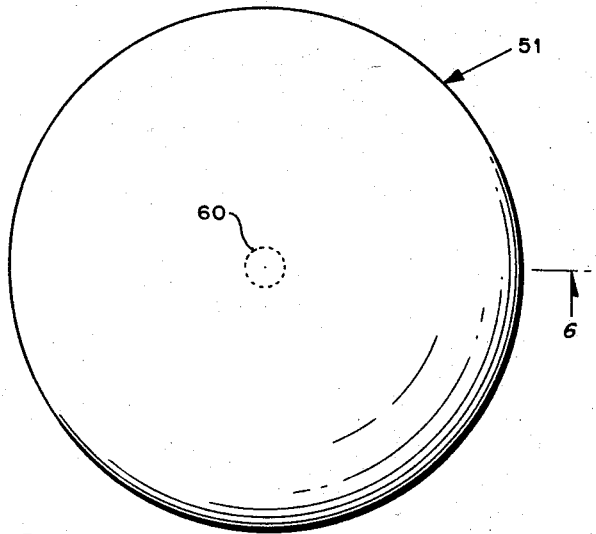
FIG. 5 is a horizontal top view of an accelerometer pendulum mass, the mass being shaped for special utility as a two-dimensional accelerometer.
Figure 6:
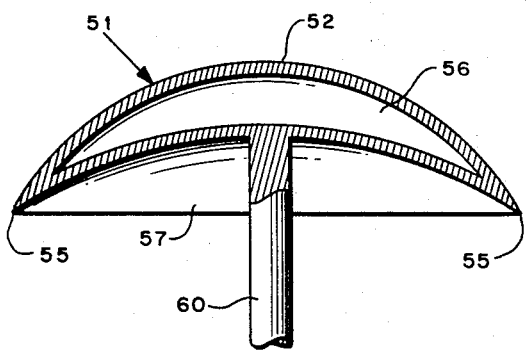
FIG. 6 is a vertical view, partly in cross-section, taken on line 6—6 of FIGURE 5.

FIGURES 5 and 6 illustrate a pendulum-bob type of mass adapted for two-dimensional measurement. As is best shown in FIGURE 6, the mass 51 is somewhat mushroom shaped. It comprises a thin shell having an upper surface 52 and a lower surface 57. These surfaces are curved so as to enclose a hollow interior 56 and to conform as nearly as possible to the arc of motion of the pendulum about its pivot. The shell terminates in a pointed edge 66 and is attached to the pivot (not shown) by means of arm 60.

It is seen that the shape shown in FIGURE 4 for a one-dimensional pendulum-bob accelerometer mass and in FIGURES 5 and 6 for a two-dimensional, pendulum-bob accelerometer mass, provide an elongated shape in the direction of the acceleration to be measured and a small cross-section perpendicular to the direction of this acceleration. This produces the high configuration constant as described above, and which is valuable in increasing the efficiency, that is, the effective acceleration as described above. The initial movement of each pendulum-bob is long an arc tangential to the acceleration to be measured, as in all pendulumed type accelerometers, and hence the elongation and cross-section criteria are met when the acceleration is applied.

The foregoing description is intended to be illustrative and not limiting, and it is intended that the scope of this invention shall be defined by the appended claim. It is apparent that the foregoing description describes an invention which may be embodied in a great many forms of widely varying appearance and operation without departing from the spirit and teaching thereof.

I claim:
1. A high efficiency accelerometer with a high effective acceleration comprising:
   a chamber,
   damping fluid contained in said chamber,
   a mass supported within said chamber and completely submerged in said fluid, said mass being moveable within said chamber and in said fluid in response to an outside acceleration,
   said chamber having a wall closest to said mass,
   means to limit the movement of said mass within said chamber,
   said mass having a fixed general configuration,
   said mass having a shape with a configuration constant $c$ of at least 2 and being positioned in said chamber at a distance from said closest wall which is large compared to the size of said mass, said distance being large enough so that the effect of said wall on the movement of said mass is negligible and so that the configuration constant $c$ is substantially that due to said mass shape and is appreciably unaltered because of said wall,
   the average specific gravity $\rho_m$ of said mass being small compared to the specific gravity $\rho_f$ of said fluid, the difference between said specific gravities being large enough and said distance to said closest wall being large enough, so that in the equation

$$A = \frac{\rho_m - \rho_f}{\rho_m + \frac{1}{C}\rho_f} a$$

where $A$ is said effective acceleration of said mass and $a$ is said imparted outside acceleration, then $A$ is at least $\approx -2a$, said accelerometer being two-dimensional and of the pendulum type, said mass being supported within said chamber by a rigid arm, said arm being pivoted about a pivot to permit movement of said mass along an arc around said pivot in response to said outside acceleration to be measured, said outside acceleration being initially applied tangentially to said arc, said mass having an upper surface in the form of a spherical section and a lower surface in the form of a spherical section wherein said lower surface spherical section has a radius greater than that of the radius of said upper surface spherical section.

References Cited
UNITED STATES PATENTS

| | | | |
|---|---|---|---|
| 957,908 | 5/1910 | Ross. | |
| 1,890,901 | 12/1932 | Christie et al. | 73—449 |
| 2,154,678 | 3/1939 | Hawthorne et al. | 33—215.3 |
| 2,677,270 | 5/1954 | Sanderson | 73—515 XR |
| 2,713,726 | 7/1955 | Dixson. | |
| 2,840,366 | 6/1958 | Wing | 73—497 |
| 3,029,644 | 4/1962 | Loveless et al. | 73—516 XR |
| 3,132,520 | 5/1964 | Wing | 73—516 XR |
| 3,195,357 | 7/1965 | Bentley et al. | 73—516 XR |

FOREIGN PATENTS 678,766  7/1939  Germany.

JAMES J. GILL, Primary Examiner.

RICHARD C. QUEISSER, Examiner.